United States Patent [19]

Khinkis

[11] Patent Number: 4,761,132

[45] Date of Patent: Aug. 2, 1988

[54] OXYGEN ENRICHED COMBUSTION

[75] Inventor: Mark J. Khinkis, Morton Grove, Ill.

[73] Assignee: Combustion Tec, Inc., Orlando, Fla.

[21] Appl. No.: 21,719

[22] Filed: Mar. 4, 1987

[51] Int. Cl.$^4$ ............................................. F23M 3/04
[52] U.S. Cl. ...................................... 431/10; 431/12; 431/351; 110/345
[58] Field of Search .................. 431/10, 12, 351, 175, 431/4, 174, 179, 11; 423/235, 210; 110/342, 347, 343, 344, 190, 345

[56] References Cited

U.S. PATENT DOCUMENTS

| | | | |
|---|---|---|---|
| 3,656,878 | 4/1972 | Wright | 431/10 |
| 3,837,788 | 9/1974 | Craig et al. | 431/351 |
| 3,914,091 | 10/1975 | Yamagishi et al. | 431/10 |
| 4,054,407 | 10/1977 | Carrubba et al. | 431/10 |
| 4,427,362 | 1/1984 | Dykema | 431/4 |
| 4,505,666 | 3/1985 | Martin et al. | 431/10 |
| 4,517,165 | 5/1985 | Moriarty | 431/10 |

Primary Examiner—James C. Yeung
Attorney, Agent, or Firm—Thomas W. Speckman; Ann W. Speckman

[57] ABSTRACT

A process and apparatus for oxygen-rich combustion wherein a first portion of about 5 to about 40 percent of the total fuel to be cracked and combusted is introduced to a cracking chamber where it is combusted and cracked at a temperature below about 2200° C. to produce a cracked products mixture. Oxygen-rich gas of greater than about 30 volume percent oxygen is introduced to the cracking chamber in about 5 to about 50 percent of the stoichiometric requirement for complete combustion of the first portion of fuel introduced to that chamber. Cracked products mixture, a second remaining portion of fresh fuel and oxidizer having sufficient oxygen for substantially complete combustion of the combustible portion of the cracked products mixture and the fresh fuel is introduced to a combustion chamber wherein the combustible portion of the cracked products mixture and the fresh fuel is combusted. The process and apparatus provide a controllable, highly luminous, high temperature and high kinetic energy flame in the combustion chamber resulting in enhanced heat transfer rate to the furnace load, increased furnace specific production rate, increased furnace thermal efficiency, and reduced nitrogen oxides pollutant emissions.

36 Claims, 1 Drawing Sheet

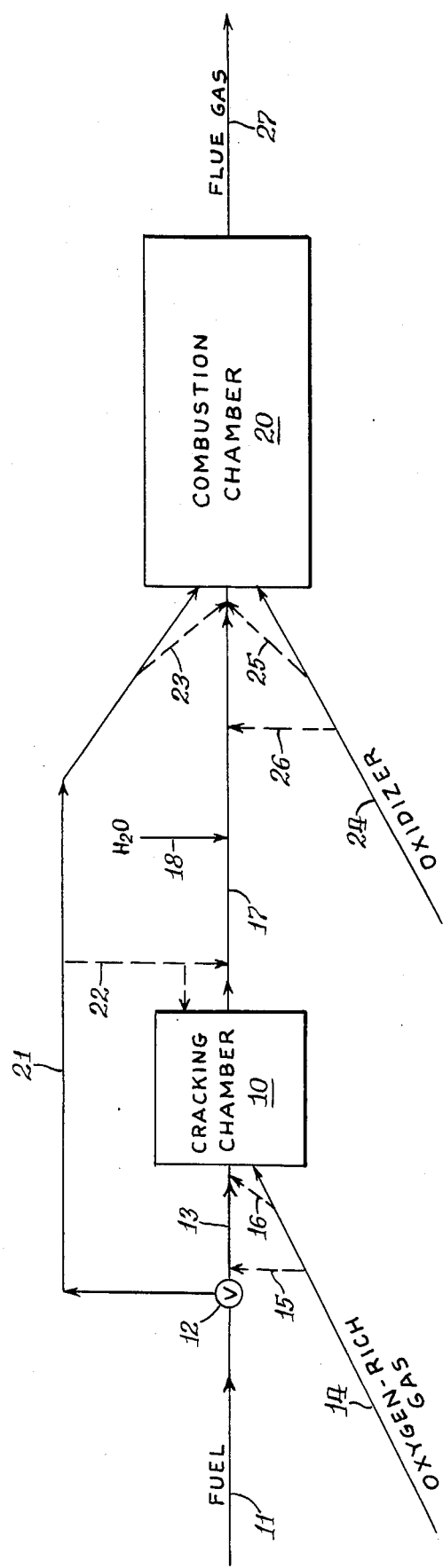

OXYGEN ENRICHED COMBUSTION

BACKGROUND OF THE INVENTION

1. Field of the Invention

This invention relates to a process and apparatus for oxygen enriched fossil and synthetic fuel combustion in a controllable, highly luminous, high temperature and high kinetic energy flame. The process and apparatus of this invention provides increased heat transfer to the furnace load, enhanced furnace specific production rate, improved furnace efficiency and reduction in emission of nitrogen oxides. The process and apparatus of this invention has widespread industrial use, such as in the glass making industry.

2. Description of the Prior Art

There have been a number of attempts by a wide variety of techniques to provide a combustion of hydrocarbon material in a manner to provide improved furnace productivity and increased furnace efficiency, while reducing nitrogen oxides emitted from the furnace. Methods for using oxygen in combustion have been recognized as: addition of oxygen to combustion air; addition of oxygen separately to the combustion zone, as by a lance; and use of a mixed oxygen/fuel burner.

A number of U.S. patents teach staged combustion, principally to obtain lower $NO_x$ emissions. U.S. Pat. No. 4,427,362 teaches a two stage combustion process wherein all of the fuel is mixed with oxygen or oxygen enriched air to provide 45 to 75 percent of the stoichiometric oxygen for combustion and combusted in a first zone with the combustion products being maintained at higher than 2858° F. The combustion products of the first combustion zone are passed to a second combustion zone with 100 to 120 percent stoichiometric air added and combusted at about 2426° to about 3146° F. This patent teaches that the soot and char from the first combustion zone enhances the $NO_x$ reduction rate. U.S. Pat. No. 3,656,878 teaches a high luminosity flame burner wherein all of the combustion air and a portion of hydrocarbon fuel is introduced to a first combustion zone where partial combustion in a diffusion flame produces solid soot particles. It is taught that a free radical promoter may be used and that oxygen is a soot promoter, the free radical promoting effect of oxygen predominating at low concentrations results in increased soot formation. The products of the first combustion zone and fresh hydrocarbon fuel are introduced to the second combustion zone wherein combustion is carried out with a high luminosity flame enhanced by the presence of the soot. U.S. Pat. No. 3,837,788 teaches reduction of $NO_x$ emissions from a two stage combustion process wherein in the first stage fuel is burned with less than about 75 to 80 percent stoichiometry air producing combustion gases at temperatures less than 2700° F., the temperature above which significant amounts of $NO_x$ are produced. The product of the first combustion stage, plus air to support low temperature combustion is passed to a second stage for complete combustion in a specially cooled system so that combustion is carried out at a low temperature, less than that at which $NO_x$ is produced. U.S. Pat. No. 4,505,666 teaches staged two zone combustion for low $NO_x$ emissions wherein about 80 to 95 percent of the combustion air and about 40 to 60 percent of the fuel is supplied to a first combustion zone in a fuel lean mixture and the products of the first combustion zone are supplied to the second combustion zone together with 5 to 20 percent of the air and 40 to 60 percent of the fuel in a fuel-rich mixture. U.S. Pat. No. 4,054,407 teaches a staged catalytic combustion wherein a first stage fuel-rich/air mixture of about 0.2 to 0.5 stoichiometry is combusted in the presence of a catalyst to maintain a low temperature of about 1000° to 1500° F. and a second stage combusts the gaseous products of the first stage with the addition of air to at least stoichiometric amounts, with excess air being used to retain a low temperature. U.S. Pat. No. 3,914,091 teaches two stage catalytic combustion wherein a first stage is carried out under fuel-rich conditions with less than 70 percent of stoichiometric air in the presence of a nickel catalyst and a second stage combustion of the product gases of the first stage with additional air to at least stoichiometric amounts is effected to result in low $NO_x$ emissions. Other patents relating to staged combustion processes are U.S. Pat. Nos. 4,405,587; 4,488,866 and 4,403,941.

SUMMARY OF THE INVENTION

It is an object of this invention to provide a combustion process and apparatus for increasing industrial furnace productivity and increasing overall furnace thermal efficiency.

It is another object of this invention to provide combustion of hydrocarbon fuels in a controllable, highly luminous, high temperature and high kinetic energy flame.

It is still another object of this invention to provide highly efficient thermal transfer from a flame to the load of a furnace.

It is yet another object of this invention to provide combustion of hydrocarbon materials with reduced nitrogen oxide emission.

It is still another object of this invention to provide highly efficient oxygen enriched combustion of hydrocarbon materials.

This invention provides improved oxygen enriched combustion which increases flame luminosity, temperature and kinetic energy, while increasing heat transfer to the load. The improved combustion of this invention reduces the adverse effects of cycling in regenerative furnaces and reduces $NO_x$ pollutant emissions.

The process according to this invention is carried out in two physically separated stages, a cracking stage and a combustion stage. A cracking chamber is fed about 5 to about 40 percent of the total fuel to be cracked and combusted. This portion of the fuel is cracked in the cracking chamber under fuel-rich conditions with oxygen-rich gas. The oxygen-rich gas is fed to the cracking chamber in an amount of about 5 to about 50 percent of the stoichiometric requirement for complete oxidation of the fuel fed to the cracking chamber and is in a form comprising greater than about 30 volume percent oxygen. Cracking is carried out in the cracking chamber at below about 2200° F. producing a cracked products mixture. The cracked products mixture comprises uncracked fuel, carbon monoxide, hydrogen, carbon dioxide, water, soot and some inerts. The cracked products mixture is passed to a combustion chamber and the remainder of fresh fuel and sufficient oxygen for substantially complete combustion of all of the fuel is combusted in the combustion chamber producing a controllable, high luminosity, high temperature and high kinetic energy flame. Combustion according to this invention is suitable for a wide variety of industrial processes, such as glass melting furnaces.

BRIEF DESCRIPTION OF THE DRAWING

The FIGURE is a highly stylized, simplified, flow diagram illustrating one embodiment of an apparatus for conduct of the process according to this invention.

DESCRIPTION OF THE PREFERRED EMBODIMENTS

Hydrocarbon fuels for use in the combustion of this invention include fossil derived and synthetic fuels. Gaseous, liquid, vaporized liquid, pulverized solid, and solid/liquid mixture fuels may be used. Preferred hydrocarbon fuels include natural gas, synthetic natural gas (SNG), propane, and other mixtures comprising low molecular weight hydrocarbonaceous materials, such as methane. The fuel may comprise additives known to the art for specific purposes. The fuel may be preheated by any means known to the art including, preferably, by thermal transfer from one or both of the cracking and combustion chambers or the flue gas by any known means of thermal transfer. It is preferred that the fuel be preheated to temperatures of about 500° to 1500° F., most preferably about 700° to 1200° F., prior to introduction to either or both of the cracking and combustion chambers. The fuel may be introduced into the cracking and combustion chambers through any suitable nozzle as known to the art for enhancing reaction within the chambers. About 5 to about 40 percent of the total fuel to be cracked and combusted is introduced to the cracking chamber with about 60 to about 95 percent of the fuel to be burned introduced as fresh fuel to the combustion chamber. In preferred embodiments, about 20 to about 40 percent of the total fuel to be cracked and combusted is introduced into the cracking chamber and about 60 to about 80 percent of the fresh fuel is introduced directly to the combustion chamber. The fuel supply conduit may be appropriately valved upstream from the cracking chamber to provide adjustable and controlled bypass of fresh fuel to the combustion chamber.

"Oxygen-rich gas" as used throughout this disclosure and claims refers to gas having higher oxygen content than air and includes up to 100 percent oxygen. Oxygen-rich gas comprising greater than about 30 volume percent oxygen, preferably about 70 to 100 volume percent oxygen is supplied to the cracking chamber for sub-stoichiometric combustion of a portion of the fuel in the cracking chamber. Commercially available "industrial" oxygen is in the order of 75 volume percent and higher oxygen and is satisfactory for use in this invention. The oxygen-rich gas is supplied to the cracking chamber in an amount of about 5 to about 50 percent of the stoichiometric requirement for complete combustion, about 10 to about 20 percent of the stoichiometric requirement being preferred. The oxygen-rich gas may be preheated to about 600° to about 1000° F. by any suitable thermal transfer means, most preferably utilizing thermal energy in the flue gases exiting the cracking and/or combustion chambers. The oxygen-rich gas may be introduced to the cracking chamber by introduction to the fuel conduit and mixing with the fuel therein, by introduction to the fuel nozzle and mixed with the fuel therein for injection into the cracking chamber, or the oxygen-rich gas may be separately introduced to the cracking chamber.

Sub-stoichiometric combustion of a portion of the 5 to about 50 percent of the fuel introduced to the cracking chamber is conducted to obtain a temperature below about 2200° F., preferably about 1400° to about 2200° F. and most preferably about 1600° to about 1800° F. The temperature is maintained or adjusted by the amount of oxygen-rich gas fed to the cracking chamber. Cracking in the cracking chamber under the above conditions results in cracked products mixture comprising uncracked fuel, carbon monoxide, hydrogen, carbon dioxide, water, soot and inerts.

The cracked products mixture is passed to the combustion chamber. It is desirable to cool the cracked products mixture to below about 800° F., preferably to about 500° to about 700° F. prior to its introduction into the combustion chamber. Cooling is desirable to freeze to stabilize the cracked products mixture by avoiding oxidation of soot; to provide reliable combustion control; to provide reliable burner operation, and to reduce thermal losses in the fuel distribution pipeline. Cooling may be achieved by passing the cracked products mixture in a final stage of the cracking chamber or exiting the cracking chamber over a heat exchanger, adding water or steam to the mixture, or by mixing with some or all the oxidizer and/or remainder of the fresh fuel. Steam, fresh fuel and/or oxidizer may be added to the fuel mixture prior to introduction to a nozzle feeding into to the combustion chamber. Alternatively, all or any part of any of the steam, the fresh fuel, or the oxidizer may be introduced to a nozzle injecting the cracked products mixture or may be introduced to the exit of such nozzle, or may be introduced separately directly to the combustion chamber and mixed with the cracked products mixture therein. The oxidizer introduced to the combustion chamber comprises sufficient oxygen for substantially complete combustion of all of the fuel in the combustion chamber. The process of this invention provides substantially complete combustion with reduced amounts of excess air. The oxidizer may comprise atmospheric air alone, oxygen enriched atmospheric air having any amount of oxygen in excess to that of atmospheric air and up to 100 percent, or an oxygen-rich gas such as "industrial" oxygen or those gases comprising about 70 to about 100 percent oxygen. The oxidizer or a portion of it may preferably be preheated to about 600° to 2500° F., by any known thermal transfer means, preferably utilizing the thermal energy in the flue gases exiting the cracking and/or combustion chambers.

Combustion in the combustion chamber produces a controllable length and shape of the flame providing high luminosity, high temperature, and a high kinetic energy flame. High luminous flames result in about $1.5 \times 10^{-4}$ pounds of soot or solids per Standard Cubic Foot of the combustion products. The process of this invention provides flames resulting in about 2.0 to about $3.0 \times 10^{-4}$ lb/SCF. This highly efficient combustion results in an increased heat transfer to the furnace load. The increases in both combustion efficiency and thermal transfer to the load provide increased furnace specific production rate and reduced specific fuel consumption. Depending upon the type of combustion chamber, the flame temperature in the process of this invention may be up to about 4000° F. The process of this invention also reduces furnace $NO_x$ emission due to increased specific production rate, reduced specific fuel consumption, greater ability to control flame length and shape, and reduced peak flame temperature.

The figure shows fuel supply conduit 11 from any suitable supply source, not shown. Fuel valve 12 controls the amount of fuel fed to cracking chamber 10 through fuel supply conduit 13 and the amount of fuel which bypasses the cracking chamber and passes as fresh fuel through fuel supply conduit 21 to combustion chamber 20. Oxygen-rich gas may be supplied by any suitable source, not shown, through oxygen-rich gas supply conduit 14 which may be fed directly into cracking chamber 10 or, as shown by the dashed lines, by conduit 16 to the fuel nozzle or by conduit 15 to fuel supply conduit 13. The oxygen-rich gas may be supplied to cracking chamber 10 by any single or combination of these means of introduction of oxygen-rich gas for mixing with the fuel for sub-stoichiometric combustion of a portion of the fuel fed to cracking chamber 10. Sub-stoichiometric combustion as carried out in cracking chamber 10 produces elevated temperatures of below about 2200° F. and cracks a substantial amount of the excess hydrocarbon fuel to a lower molecular weight fuel and forms considerable amount of black carbon solid or soot, about 0.05 to about 0.2 pound per pound of fuel. The mixture of cracked products is passed through cracked products mixture conduit 17 to combustion chamber 20. The cracked products mixture is preferably cooled at the cracking chamber exit by introduction of water or stream through conduit 18 or by any other suitable heat exchanger. Fresh fuel may be added to the exit end of cracking chamber 10 and/or to cracked products mixture conduit 17 through fresh fuel conduit 22, and/or may be added through conduit 23 to a nozzle leading into combustion chamber 20, and/or may be fed directly from fresh fuel supply conduit 21 separately into combustion chamber 20. Oxidizer is supplied through oxidizer conduit 24 from any suitable source, not shown. Oxidizer may be supplied through oxidizer conduit 26 to mix with cracked products mixture in conduit 17 and/or may be supplied through oxidizer conduit 25 to a nozzle leading into combustion chamber 20 and/or may be supplied separately to combustion chamber 20. High temperature combustion with high heat transfer to the furnace load may be conducted in primary combustion chamber 20 using arrangements of various types of burners as known to the art to be suitable for the particular process desired and flue gas exits through conduit 27. It should be readily apparent that while the simplified figure shows introduction of cracked products mixture, fresh fuel, and oxidizer in association with a single burner or port, that each of these conduits may be fed as desired to multiple burners and multiple ports as required by the process for which the combustion system is used. Likewise, it should be readily apparent that a single cracking chamber 10 or multiple cracking chambers 10 may be used in accordance with this invention. Control means for conduct of the desired flows as shown in the figure, should be readily apparent to one skilled in the art.

The combustion process and apparatus of this invention may advantageously be used in glass melting furnaces, such as a regenerative end port glass furnace which has a single entrance port and a single exit port and a regenerative sideport glass furnace which has multiple entrance ports and multiple exit ports. Both types of furnaces are equipped with regenerators to provide high efficiency heat recovery.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a process for combustion of hydrocarbon fuel, the steps comprising:

introducing a first portion of about 5 to about 40 percent of the total said fuel to be cracked and combusted to a cracking chamber;

introducing to said cracking chamber oxygen-rich gas in an amount about 5 to about 50 percent of the stoichiometric requirement for complete combustion of said first portion of fuel, said oxygen-rich gas comprising greater than about 30 volume percent oxygen;

combusting and cracking said first portion of fuel with said oxygen-rich gas in said cracking combustion chamber at a temperature below about 2200° F. producing a cracked products mixture;

passing and introducing said cracked products mixture to a combustion chamber;

introducing to said combustion chamber a second remaining portion of said fuel and oxidizer comprising sufficient oxygen for substantially complete combustion of all of said fuel in said combustion chamber; and combusting the combustible portion of said cracked products mixture and said fuel in said combustion chamber.

2. A process for combustion of claim 1 wherein said first portion of fuel is about 20 to about 40 percent of said total fuel.

3. A process for combustion of claim 1 wherein said second portion of fuel is about 60 to about 80 percent of said total fuel.

4. A process for combustion of claim 1 wherein said fuel is preheated to about 500° to about 1500° F. prior to introduction to one of said cracking and combustion chambers.

5. A process for combustion of claim 1 wherein said oxygen-rich gas comprises about 70 to 100 volume percent oxygen.

6. A process of combustion of claim 1 wherein said oxygen-rich gas is introduced to said cracking chamber in an amount of about 10 to about 20 percent of said stoichiometric requirement.

7. A process for combustion of claim 1 wherein said oxygen-rich gas is preheated to about 600° to about 1000° F.

8. A process for combination of claim 1 wherein said cracking chamber is maintained at about 1400° to about 2200° F.

9. A process for combustion of claim 1 wherein said cracking chamber is maintained at about 1600° to about 1800° F.

10. A process for combustion of claim 1 wherein said cracked products mixture is cooled to below 800° F. prior to introduction to said combustion chamber.

11. A process for combustion of claim 1 wherein said cracked products mixture is cooled to 500° to about 700° F. prior to introduction to said combustion chamber.

12. A process for combustion of claim 1 wherein said oxidizer comprises air.

13. A process for combustion of claim 1 wherein said oxidizer is air.

14. A process for combustion of claim 1 wherein said oxidizer is preheated to about 600° to about 2500° F.

15. A process for combustion of claim 1 wherein said second remaining portion of said fuel is mixed with said cracked products mixture prior to a fuel nozzle into said combustion chamber.

16. A process for combustion of claim 1 wherein said second remaining portion of said fuel is mixed with said cracked products mixture in a fuel nozzle into said combustion chamber.

17. A process for combustion of claim 1 wherein said fuel is introduced separately from said cracked products mixture into said combustion chamber.

18. A process for combustion of claim 1 wherein said oxidizer is mixed with said fuel mixture prior to a fuel nozzle into said combustion chamber.

19. A process for combustion of claim 1 wherein said oxidizer is mixed with said fuel mixture in a fuel nozzle into said combustion chamber.

20. A process for combustion of claim 1 wherein said oxidizer is mixed with said fuel mixture into said combustion chamber.

21. A process for combustion of claim 1 wherein said combusting in said combustion chamber is carried out at flame temperatures up to about 4000° F.

22. An apparatus for combustion of hydrocarbon fuel comprising:
   a cracking chamber and a combustion chamber;
   means for introducing a first portion of about 5 to about 40 percent of the total said fuel to be cracked and combusted to said cracking chamber;
   means for introducing to said cracking chamber oxygen-rich gas comprising greater than about 30 volume percent oxygen in an amount about 5 to about 50 percent of the stoichiometric requirement for complete combustion therein;
   means for combusting and cracking said first portion of fuel in said cracking chamber at a temperature below about 2200° F. producing a cracked products mixture;
   means for passing and introducing said cracked products mixture to said combustion chamber;
   means for introducing to said combustion chamber a second remaining portion of said fuel to be burned in said combustion chamber without having passed through said cracking chamber;
   means for introducing to said combustion chamber oxidizer comprising sufficient oxygen for substantially complete combustion of all of said fuel in said combustion chamber;
   means for combusting the combustible portion of said cracked products mixture and said fuel in said combustion chamber; and
   means for removing flue gas from said combustion chamber.

23. An apparatus for combustion of claim 22 additionally comprising means to proportion and feed about 20 to about 40 percent of said fuel to said cracking chamber and about 60 to about 80 percent of said fuel to said combustion chamber.

24. An apparatus for combustion of claim 22 additionally comprising means to preheat said fuel to about 500° to about 1500° F. prior to introduction to one of said cracking and combustion chambers.

25. An apparatus for combustion of claim 22 additionally comprising means to preheat said oxygen-rich gas to about 600° to about 1000° F.

26. An apparatus for combustion of claim 22 additionally comprising means to cool said cracked products mixture to below about 800° F. prior to introduction to said combustion chamber.

27. An apparatus for combustion of claim 22 additionally comprising means to preheat said oxidizer to about 600° to about 2500° F.

28. An apparatus for combustion of claim 22 additionally comprising means to mix said oxygen-rich gas with said fuel.

29. An apparatus for combustion of claim 22 additionally comprising means to separately introduce said oxygen-rich gas to said cracking chamber.

30. An apparatus for combustion of claim 22 additionally comprising means to mix said cracked products mixture and said second remainder portion of fuel.

31. An apparatus for combustion of claim 22 additionally comprising means to separately introduce said second remainder portion of fuel to said combustion chamber.

32. An apparatus for combustion of claim 22 additionally comprising means to mix said oxidizer with said cracked products mixture.

33. An appartus for combustion of claim 22 additionally comprising means to separately introduce said oxidizer to said combustion chamber.

34. In a process for combustion of hydrocarbon fuel, the steps comprising:
   introducing a first portion of about 20 to about 40 percent of the total said fuel to be cracked and combusted to a cracking chamber;
   introducing to said cracking chamber oxygen-rich gas in an amount about 10 to about 20 percent of the stoichiometric requirement for complete combustion of said first portion of fuel, said oxygen-rich gas comprsing about 70 to 100 volume percent oxygen;
   combusting and cracking said first portion of fuel with said oxygen-rich gas in said cracking chamber at a temperature about 1400° to about 2200° F. producing a cracked products mixture;
   passing and introducing said cracked products mixture to a combustion chamber, said cracked products mixture cooled to below 800° F. prior to introduction to said combustion chamber;
   introducing to said combustion chamber a second remaining portion of said fuel and oxidizer comprising sufficient oxygen for substantially complete combustion of all of said fuel in said combustion chamber, said oxidizer preheated to about 600° to about 2500° F. and said fuel preheated to about 500° to about 1500° F. prior to introduction to one of said cracking and combustion chambers; and
   combusting the combustible portion of said cracked products mixture and said fuel in said combustion chamber.

35. A process for combustion of claim 34 wherein said oxygen-rich gas is preheated to about 600° to about 1000° F.

36. An apparatus for combustion of hydrocarbon fuel comprising:
   a cracking chamber and a combustion chamber;
   means to proportion and introduce a first portion of about 20 to about 40 percent of the total said fuel to be cracked and combusted to said cracking chamber;
   means for introducing to said cracking chamber oxygen-rich gas comprising greater than about 30 volume percent oxygen in an amount about 5 to about 50 percent of the stoichiometric requirement for complete combustion therein;

means to preheat said oxygen-rich gas to about 600° to about 1000° F.;

means for combusting and cracking said first portion of fuel in said cracking chamber at a temperature below about 2200° F. producing a cracked products mixture;

means for passing and introducing said cracked products mixture to said combustion chamber;

means to cool said cracked products mixture to below about 800° F. prior to introduction to said combustion chamber;

means for introducing to said combustion chamber a remaining second portion of said fuel to be burned in said combustion chamber without having passed through said cracking chamber;

means to preheat said fuel to about 500° to about 1500° F. prior to introduction to one of said cracking and combustion chambers;

means for introducing to said combustion chamber oxidizer comprising sufficient oxygen for substantially complete combustion of all of said fuel in said combustion chamber;

means to preheat said oxidizer to about 600° to about 2500° F.;

means for combusting the combustible portion of said cracked products mixture and said fuel in said combustion chamber; and means for removing flue gas from said combustion chamber.

* * * * *

UNITED STATES PATENT AND TRADEMARK OFFICE
CERTIFICATE OF CORRECTION

PATENT NO. : 4,761,132
DATED : August 2, 1988
INVENTOR(S) : Mark J. Khinkis

It is certified that error appears in the above—identified patent and that said Letters Patent is hereby corrected as shown below:

In the Abstract, line 5, delete "2200°C." and in its place insert --2200°F.--;

Col. 4, line 17, delete "to" and in its place insert --or--;

Col. 6, line 52, delete "combination" and in its place insert --combustion--.

Signed and Sealed this

Second Day of January, 1990

Attest:

JEFFREY M. SAMUELS

Attesting Officer     Acting Commissioner of Patents and Trademarks